(12) United States Patent
Seo et al.

(10) Patent No.: US 12,495,773 B1
(45) Date of Patent: Dec. 16, 2025

(54) TECHNIQUE FOR RECOGNIZING WHETHER A SOW HAS COMPLETED FARROWING OF A NEWBORN PIGLET

(71) Applicant: M3SEN Co., Ltd., Seoul (KR)

(72) Inventors: Man Hyeong Seo, Gyeonggi-do (KR); Ki Hoon Ahn, Gyeonggi-do (KR)

(73) Assignee: M3SEN CO., LTD., Seoul (KR)

( * ) Notice: Subject to any disclaimer, the term of this patent is extended or adjusted under 35 U.S.C. 154(b) by 0 days.

(21) Appl. No.: 19/251,231

(22) Filed: Jun. 26, 2025

(30) Foreign Application Priority Data

Jul. 25, 2024 (KR) .................. 10-2024-0098594

(51) Int. Cl.
*A01K 29/00* (2006.01)
*G06V 10/25* (2022.01)
*G06V 10/82* (2022.01)
*G06V 40/10* (2022.01)

(52) U.S. Cl.
CPC ............ *A01K 29/005* (2013.01); *G06V 10/25* (2022.01); *G06V 10/82* (2022.01); *G06V 40/10* (2022.01)

(58) Field of Classification Search
CPC ...... A01K 29/005; G06V 10/25; G06V 10/82; G06V 40/10
See application file for complete search history.

(56) References Cited

U.S. PATENT DOCUMENTS

| 2009/0241203 | A1* | 9/2009 | Welsh | ............... C07K 14/4712 435/456 |
| 2013/0191931 | A1* | 7/2013 | Grompe | ............ G01N 33/5008 435/6.12 |
| 2021/0400920 | A1* | 12/2021 | Rooda | ................... G06T 7/0012 |
| 2025/0017715 | A1* | 1/2025 | Rooda | ................. A61D 17/008 |

FOREIGN PATENT DOCUMENTS

| KR | 102302040 B1 | 9/2021 |
| KR | 102372107 B1 | 3/2022 |
| KR | 102405940 B1 | 6/2022 |
| KR | 102425523 A | 7/2022 |
| KR | 102568301 B1 | 8/2023 |
| KR | 102600622 B1 | 11/2023 |

\* cited by examiner

*Primary Examiner* — Santiago Garcia
(74) *Attorney, Agent, or Firm* — Simpson & Simpson, PLLC

(57) ABSTRACT

A method for recognizing whether a sow has completed farrowing of a newborn piglet including: acquiring video data in which at least part of the sow is captured from an external device through a communication unit; recognizing whether the sow has completed farrowing of the newborn piglet based on a change in output values of each of a plurality of image frames constituting the video data, the output values being values output from a pre-trained artificial intelligence model by sequentially inputting each of the plurality of image frames constituting the video data into the pre-trained artificial intelligence model, wherein the pre-trained artificial intelligence model, when a first image frame, among the plurality of image frames, in which at least part of edges of a plurality of objects forms a preset shape is input, may output an output value including a first specific class value indicating that farrowing is in progress.

14 Claims, 11 Drawing Sheets

TECHNIQUE FOR RECOGNIZING WHETHER A SOW HAS COMPLETED FARROWING OF A NEWBORN PIGLET

CROSS-REFERENCE TO RELATED APPLICATIONS

This application claims priority pursuant to 35 U.S.C. 119 (a) to Korean Patent Application 10-2024-0098594, filed Jul. 25, 2024, which application is incorporated herein by reference in its entirety.

BACKGROUND

1. Technical Field

The present disclosure relates to a technique for recognizing whether a sow has completed farrowing of a newborn piglet, and more specifically, to a device and a method for recognizing whether the sow has completed farrowing of the newborn piglet based on a change in output values generated by sequentially inputting each of a plurality of image frames constituting video data into a pre-trained artificial intelligence model.

2. Related Art

Recently, as the global pig farming industry has rapidly scaled up, there has been a growing demand for high productivity at low cost. To meet this demand, the introduction of highly prolific sows—such as Danbred and PIC breeds, which give birth to 15 to 20 piglets per farrowing—has been increasing.

In addition, to prevent farrowing at night and to facilitate batch processing during daytime hours, it has become common practice to administer an induction agent (PGF2α) to sows near the expected farrowing date in order to induce farrowing within a certain period of time.

Although a large number of piglets are born from such highly prolific sows, the average birth weight of the piglets tends to be low, resulting in a lower survival rate unless they are managed carefully.

Although the gestation period of pigs is known to be 114 days, actual farrowing often varies by approximately +2 days from the expected date depending on the individual. For operational convenience, induction agents are administered, but piglets born early as a result tend to have lower birth weights, leading to a lower survival rate unless managed with care.

In addition, highly prolific sows tend to have longer total farrowing durations, and piglets born later in the farrowing sequence ingest colostrum containing lower concentrations of immunoglobulin G (IgG), resulting in reduced immunity and lower survival rates, which poses a limitation to improving productivity.

In addition, one of the most longstanding issues has been the occurrence of intrauterine stillbirths due to dystocia, in which the farrowing interval exceeds approximately 15 minutes as a result of deteriorated health or physical condition of the sow, and deaths caused by asphyxiation when piglets are born covered in fetal membranes.

In addition, in countries like Korea, where there are distinct seasonal changes and large temperature fluctuations, and where intensive farming environments are common, low-birth-weight piglets born from highly prolific sows or born prematurely tend to die more easily, resulting in a higher mortality rate compared to advanced livestock-producing countries.

Due to these factors, the marketed pigs per sow per year (MSY) in Korea remains significantly low at around 17 to 18, compared to 28 to 35 in advanced livestock-producing countries, making improvement in this area an urgent issue.

To address these issues, the domestic pig farming industry has conventionally relied on workers visually checking each sow to determine the start of farrowing and taking immediate action when abnormal signs are detected. However, due to the nature of the industry, where the number of animals is large, it is practically difficult to manage all individual sows meticulously, and it is especially challenging to monitor sows that farrow at night or during late hours.

Some farms have used remote monitoring systems based on CCTV cameras, but these also ultimately rely on human visual inspection, and therefore do not provide a fundamental solution.

Accordingly, there is a growing need to develop a technique for recognizing whether a sow has completed farrowing of a newborn piglet.

SUMMARY

The present disclosure is intended to address the aforementioned problems, as well as other issues.

A technical problem to be achieved by some embodiments of the present disclosure is to recognize whether a sow has completed farrowing of a newborn piglet.

The technical problems to be addressed by the present disclosure are not limited to those mentioned above, and other technical challenges not explicitly stated will be readily understood by those skilled in the art from the following description.

According to some embodiments of the present disclosure, a method for recognizing whether a sow has completed farrowing of a newborn piglet by a processor of a device comprises: acquiring video data in which at least part of the sow is captured from an external device through a communication unit; and recognizing whether the sow has completed farrowing of the newborn piglet based on a change in output values related to each of a plurality of image frames constituting the video data, the output values being values output from a pre-trained artificial intelligence model by sequentially inputting each of the plurality of image frames constituting the video data into the pre-trained artificial intelligence model, wherein the pre-trained artificial intelligence model, when a first image frame, among the plurality of image frames constituting the video data, in which at least part of edges of a plurality of objects forms a preset shape is input, may output an output value including a first specific class value indicating that farrowing is in progress and information on a region where the first specific class value is recognized.

According to some embodiments of the present disclosure, the plurality of objects may include a piglet of which at least part of a preset portion has been discharged from a uterus of the sow, and a uterus of the sow.

According to some embodiments of the present disclosure, the preset shape may be an H-shape.

According to some embodiments of the present disclosure, the information may include information related to a position of a center value of the region and information related to a size of the region.

According to some embodiments of the present disclosure, the information related to the size of the region may include a horizontal length value obtained by dividing a horizontal length of the region by a horizontal length of the first image frame, and a vertical length value obtained by dividing a vertical length of the region by a vertical length of the first image frame.

According to some embodiments of the present disclosure, the information related to the position of the center value may indicate a position at which a point located at a center of the region is placed in the first image frame.

According to some embodiments of the present disclosure, when a second image frame, captured before farrowing and including the uterus of the sow, among the plurality of image frames constituting the video data, is input into the pre-trained artificial intelligence model, the pre-trained artificial intelligence model may output an output value including a first farrowing recognition class value indicating that the uterus of the sow is included in the second image frame and information on a region in which the first farrowing recognition class value is recognized.

According to some embodiments of the present disclosure, the first specific class value may be defined as a state in which the at least part of the preset portion of the piglet has been discharged from the uterus of the sow but the preset portion of the piglet has not yet been completely discharged from the uterus.

According to some embodiments of the present disclosure, when a third image frame, among the plurality of image frames constituting the video data, is input into the pre-trained artificial intelligence model, the pre-trained artificial intelligence model may output an output value including a second farrowing recognition class value and information on a region in which the second farrowing recognition class value is recognized, and the third image frame may include an image related to a time point before the preset portion of the piglet is discharged from the uterus of the sow, after the sow has started the farrowing of the piglet, or related to a time point after the preset portion of the piglet has been completely discharged from the uterus, after the sow has started the farrowing of the piglet.

According to some embodiments of the present disclosure, when a fourth image the frame, among plurality of image frames constituting the video data, is input into the pre-trained artificial intelligence model, the pre-trained artificial intelligence model may output an output value including a second specific class value and information on a region in which the second specific class value is recognized, and the fourth image frame may include an image in which the at least part of the preset portion of the piglet has been discharged from the uterus of the sow but the preset portion of the piglet has not yet been completely discharged from the uterus, and at least one of the uterus or the piglet is covered by a preset obstacle.

According to some embodiments of the present disclosure, when a fifth image frame, among the plurality of image frames constituting the video data, is input into the artificial intelligence model, the pre-trained artificial intelligence model may output an output value including a third specific class value and information on a region in which the third specific class value is recognized, and the fifth image frame may include an image in a state in which the at least part of the preset portion of the piglet has been discharged from the uterus of the sow but the preset portion of the piglet has not yet been completely discharged from the uterus, and a preset object overlaps the piglet According to some embodiments of the present disclosure, the preset obstacle may be defined as a fixing frame for preventing the piglet from being crushed.

According to some embodiments of the present disclosure, the preset object may include at least one of a tail of the sow, another piglet that was farrowed before the piglet, and a placenta.

According to some embodiments of the present disclosure, a computer program stored in a computer-readable storage medium, wherein the computer program, when executed by a processor of a device, performs steps for recognizing whether a sow has completed farrowing of a piglet, the steps comprising: acquiring video data in which at least part of the sow is captured from an external device through a communication unit; and recognizing whether the sow has completed farrowing of the newborn piglet based on a change in output values related to each of a plurality of image frames constituting the video data, the output values being values output from a pre-trained artificial intelligence model by sequentially inputting each of the plurality of image frames constituting the video data into the pre-trained artificial intelligence model, wherein the artificial intelligence model, when a first image frame, among the plurality of image frames constituting the video data, in which at least part of edges of a plurality of objects forms a preset shape is input, may output an output value including a first specific class value indicating that farrowing is in progress and information on a region where the first specific class value is recognized.

According to some embodiments of the present disclosure, a device for recognizing whether a sow has completed farrowing of a newborn piglet comprises: a communication unit configured to acquire video data, in which at least part of the sow is captured, from an external device; a storage unit storing a pre-trained artificial intelligence model and at least one program instruction; and a processor configured to execute the at least one program instruction, wherein the processor is configured to sequentially input each of a plurality of image frames constituting the video data into the pre-trained artificial intelligence model, and recognize whether the sow has completed farrowing of the newborn piglet based on a change in output values related to each of a plurality of image frames constituting the video data, the output values being values output from a pre-trained artificial intelligence model by sequentially inputting each of the plurality of image frames constituting the video data into the pre-trained artificial intelligence model, wherein the artificial intelligence model, when a first image frame, among the plurality of image frames constituting the video data, in which at least part of edges of a plurality of objects forms a preset shape is input, may output an output value including a first specific class value indicating a state indicating ongoing farrowing and information on a region where the first specific class value is recognized.

The technical solutions that can be obtained from the present disclosure are not limited to those described above, and other solutions not mentioned herein will be clearly understood by those skilled in the art to which the present disclosure pertains from the following description.

The effects of the method for recognizing whether a sow has completed farrowing of a newborn piglet according to the present disclosure are as follows.

According to some embodiments of the present disclosure, it is possible to accurately determine whether a sow has completed farrowing of a newborn piglet.

The effects that can be obtained through the present disclosure are not limited to those described above, and other effects not mentioned herein will be clearly understood by those skilled in the art to which the present disclosure pertains from the following description.

BRIEF DESCRIPTION OF THE DRAWINGS

Various embodiments of the present disclosure are described with reference to the drawings, wherein like reference numerals are used to collectively refer to similar components. In the following embodiments, numerous specific details are provided for the purpose of illustration and to offer a comprehensive understanding of one or more embodiments. However, it will be apparent that such embodiments may be implemented without these specific details.

DETAILED DESCRIPTION

Figure 1:
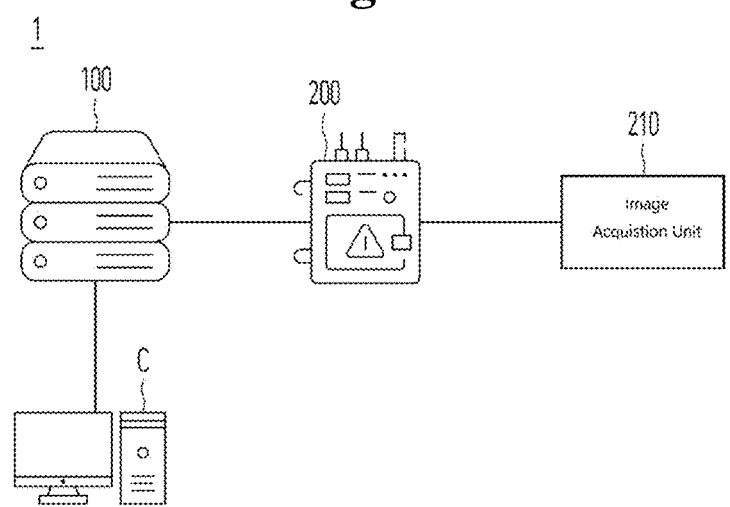
FIG. 1 is a diagram for explaining a system for recognizing whether a sow has completed farrowing of a newborn piglet according to some embodiments of the present disclosure.

Hereinafter, various embodiments of the device according to the present disclosure and a control method of the device will be described in detail with reference to the drawings. The same reference numerals will be assigned to the same or similar components regardless of the drawing numbers, and repeated descriptions thereof will be omitted.

The objects and effects of the present disclosure, as well as the technical configurations for achieving them, will become apparent with reference to the embodiments described in detail below together with the accompanying drawings. In describing one or more embodiments of the present disclosure, detailed descriptions of related known technologies will be omitted when it is determined that such descriptions could obscure the gist of at least one embodiment of the present disclosure.

The terms used in the present disclosure are defined in consideration of the functions of the present disclosure, and may vary depending on the intention or usage of the user or operator. In addition, the accompanying drawings are provided solely to facilitate understanding of one or more embodiments of the present disclosure, and the technical spirit of the present disclosure is not limited by the drawings. It should be understood that all modifications, equivalents, and substitutes that fall within the spirit and scope of the present invention are included.

In the following description, the suffixes "module" and "unit" used for the components are assigned or used interchangeably solely for convenience of description, and do not have distinct meanings or roles by themselves.

Terms including ordinal numbers such as "first" and "second" may be used to describe various components, but the components are not limited by these terms. These terms are used only for the purpose of distinguishing one component from another. Therefore, a first component I mentioned below may be a second component within the technical spirit of the present disclosure.

Unless clearly indicated otherwise in the context, the singular expressions include the plural expressions. That is, unless otherwise specified or clearly indicated as singular in context, the singular forms in the present disclosure and the claims should be interpreted as meaning "one or more."

In the present disclosure, terms such as "comprising," "includes," or "having" are intended to specify the presence of stated features, numbers, steps, operations, components, parts, or combinations thereof, but are not intended to preclude the presence or addition of one or more other features, numbers, steps, operations, components, parts, or combinations thereof.

In the present disclosure, the term "or" is to be understood as having an inclusive meaning rather than an exclusive meaning, unless explicitly stated otherwise or clearly indicated by the context. That is, "X uses A or B" is intended to mean any of the naturally inclusive interpretations: X uses A; X uses B; or X uses both A and B. In addition, the term "and/or" as used in the present disclosure should be understood to encompass all possible combinations of one or more of the listed items.

In the present disclosure, the terms "information" and "data" may be used interchangeably.

Unless otherwise defined, all terms (including technical and scientific terms) used in the present disclosure shall have meanings commonly understood by those skilled in the art to which the present disclosure pertains. Terms that are generally defined in commonly used dictionaries shall be interpreted as having meanings consistent with their ordinary meanings in the context of the relevant art and shall not be interpreted in an overly broad or restrictive manner unless expressly defined otherwise.

However, the present disclosure is not limited to the embodiments disclosed below but may be implemented in various other forms. The embodiments of the present disclosure are merely provided to fully convey the scope of the present disclosure to those skilled in the art. The present disclosure is defined only by the scope of the claims, and therefore, its definition should be made based on the entirety of the present disclosure.

According to some embodiments of the present disclosure, the device may recognize whether a sow has completed farrowing of a newborn piglet. Here, the newborn piglet may refer to the piglet that was most recently scheduled for farrowing or in the process of farrowing. The details thereof will be described below with reference to FIGS. 1 to 11.

Figure 2:
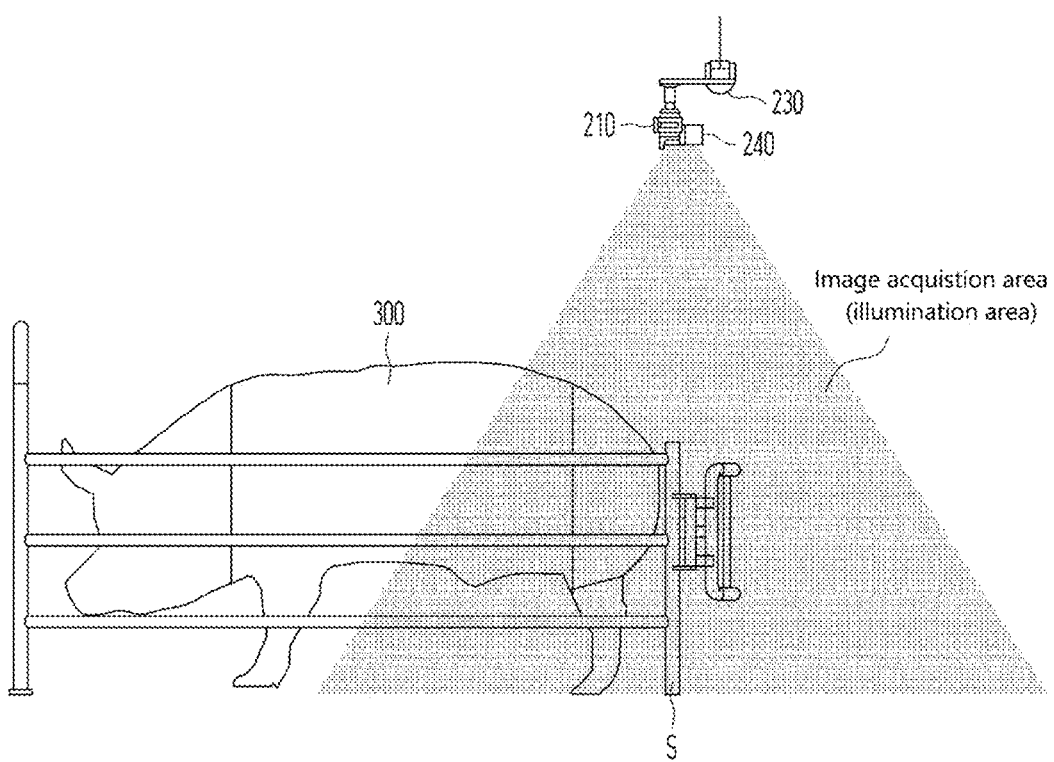
FIG. 2 is a diagram for explaining a pig house in which an image acquisition unit is installed according to some embodiments of the present disclosure.

FIG. 1 is a diagram for explaining a system for recognizing whether a sow has completed farrowing of a newborn piglet according to some embodiments of the present disclosure. FIG. 2 is a diagram for explaining a pig house in which an image acquisition unit is installed according to some embodiments of the present disclosure.

Referring to FIG. 1, a system 1 for recognizing whether a sow has completed farrowing of a newborn piglet may include a device 100, an external device 200, an image acquisition unit 210, and a client device C. The components constituting the system 1 shown in FIG. 1 are not essential for implementing the system 1, and the system 1 described in the present disclosure may have more or fewer components than those listed above.

According to some embodiments of the present disclosure, the device 100 may be a digital device or system that receives video data from an external device 200 and supplies data to or receives data from a client device C. Here, the device 100 may refer to a server. For example, the device 100 may be a service server provided by a manufacturer, which provides a web page, web content, or a web service. However, the present disclosure is not limited thereto.

In the present disclosure, the device 100 may refer to a server, but depending on the context, it may also refer to a computer system, computer device, fixed device, or mobile device, and unless specifically stated otherwise, it may be used to collectively refer to all of them.

According to some embodiments of the present disclosure, when the device 100 acquires video data from an external device 200, it may sequentially input each of a plurality of image frames constituting the video data into a pre-trained artificial intelligence model to obtain output values, and may recognize whether an event has occurred based on changes in each of the output values. Here, the event may be an event indicating that the sow has completed farrowing of a newborn piglet. However, the present disclosure is not limited thereto.

In the present disclosure, the device 100 may receive video data from an external device 200 and analyze the video data. The device 100 may supply the analysis result of the video data to the external device 200. Here, the analysis result may include at least one of: information indicating whether the sow has completed farrowing, information indicating whether there is an abnormality in the condition of the sow, and information indicating whether there is an abnormality in the surrounding environment of the sow. However, the present disclosure is not limited thereto.

The device 100 may provide a web page through which video data received from an external device 200 and the analysis result of the video data can be viewed. Accordingly, a manager may access a specific URL using a client device C, log in on the web page, and check video data related to the sow in the pig house and the analysis result of the video data. Here, the video data displayed on the web page may be real-time video data being acquired through an image acquisition unit 210. However, the present disclosure is not limited thereto.

The external device 200 may refer to a device installed in the pig house separately from the device 100, and may receive video data from an image acquisition unit 210 and transmit the video data to the device 100.

The external device 200 may perform a function of displaying the video data acquired by an image acquisition unit 210, in addition to transmitting the video data received from the image acquisition unit 210 to the device 100.

Specifically, the external device 200 may include a separate display unit and may output the video data received from an image acquisition unit 210 through the display unit. In this case, the analysis result of the video data analyzed by the device 100 may be output together with the video data through the display unit of the external device 200.

According to some embodiments of the present disclosure, a pig house in which the external device 200 is installed may be provided with at least one image acquisition unit 210. The external device 200 may collect all video data acquired from the at least one image acquisition unit 210 and transmit it to the device 100 so that the device 100 can analyze all the video data. In this case, the analysis result generated by the device 100 may be received by the external device 200, and the external device 200 may display the analysis result of the video data together with all the video data acquired from the at least one image acquisition unit 210 through the display unit. Accordingly, the manager can easily manage the sow by checking the video data and analysis result displayed on the display unit of the external device 200.

The image acquisition unit 210 may include one or more cameras for capturing video data in which at least part of the sow is captured. However, the present disclosure is not limited thereto.

Although only one image acquisition unit 210 is illustrated in FIGS. 1 and 2, a plurality of image acquisition units 210 may be installed in the pig house, and the video data acquired through the plurality of image acquisition units 210 may be transmitted to the external device 200, which may then transmit the plurality of video data to the device 100. In this case, each of the plurality of image acquisition units 210 may capture a different sow.

Referring to FIG. 2, the sow may be positioned at a specific location by a fixing frame S for preventing the piglet from being crushed, and the image acquisition unit 210 may be positioned above the specific location where the sow 300 is placed so as to capture at least part of the sow. Here, at least part of the sow may refer to the lower body of the sow. In this case, the video data acquired through the image acquisition unit 210 may include at least one of a tail of the sow, the uterus of the sow, and the hip of the sow. However, the present disclosure is not limited thereto.

According to some embodiments of the present disclosure, in the video data acquired by the image acquisition unit 210, the uterus of the sow or a piglet in the process of farrowing may be occluded by the fixing frame S. In this case, there may be a problem in that the accuracy of recognizing whether an event has occurred is reduced. Therefore, according to some embodiments of the present disclosure, the device may separately identify an image frame in which at least one of the uterus of the sow or the piglet in the process of farrowing is occluded by the fixing frame S, which is a preset obstacle.

In the present disclosure, the image acquisition unit 210 may be provided with a lighting device 240. The lighting device 240 may irradiate visible light onto an image acquisition area where video is captured through the image acquisition unit 210. Since the lighting device 240 uses visible light instead of infrared light as illumination, the image acquisition unit 210 may be capable of acquiring clearer video data of the sow.

Meanwhile, the visible light irradiated by the lighting device 240 may disturb the sow's sleep at night. To prevent this, as shown in FIG. 2, the installation positions of the image acquisition unit 210 and the lighting device 240 may be adjusted and determined so that the visible light is irradiated only onto the lower body of the SOW.

Meanwhile, a status indicator 230 may be positioned together at the location where the image acquisition unit 210 and the lighting device 240 are installed. The status indicator 230 may visually indicate the farrowing status and colostrum status of the sow. The status indicator 230 may include indicator lights of various colors and may notify various types of events based on the color, such as whether farrowing has started, whether the farrowing interval exceeds a predetermined time, whether a predetermined time has elapsed since the start of the first farrowing (i.e., whether the colostrum is still valid), and whether there is an abnormality in the surrounding environment of the sow. The manager may enter the pig house and manage each of a plurality of sows more easily by checking the color of the status indicator 230.

In the present disclosure, the external device 200 may receive the analysis result of the video data from the device 100 and may control the status indicator 230, which is installed at the location of the sow related to the video data, so that a color corresponding to the analysis result is displayed based on the analysis result of the video data.

Referring again to FIG. 1, the client device C is a device used by a manager to check the status inside the pig house from outside the pig house, and may include a desktop computer, digital TV, laptop computer, mobile phone, smartphone, tablet PC, and the like.

The manager may access a specific URL using the client device C and log in on the web page. When the manager is logged in, video data related to at least one sow in the pig house may be displayed in real time on the web page, and the analysis result of the video data may also be displayed. Accordingly, the manager can easily check the video data related to the sow in the pig house and the analysis result of the video data using the client device C.

According to some embodiments of the present disclosure, when an event (for example, an event indicating that the sow has completed farrowing of a newborn piglet) occurs, the device 100 may transmit a message to notify the manager of the event through a preset messenger program. In this case, the manager may recognize the occurrence of the event by checking the message received via the preset messenger program using the client device C, and may access the web page provided by the device 100 to view the video data acquired from the image acquisition unit 210. Accordingly, when an event occurs inside the pig house, the manager can easily check the internal situation of the pig house from outside.

Figure 3:
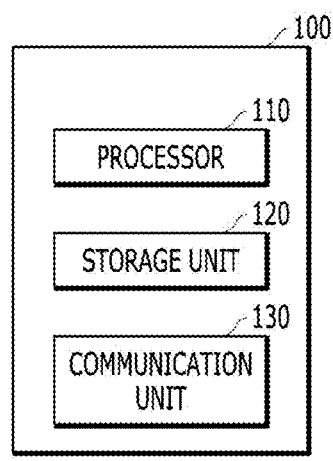
FIG. 3 is a block diagram for explaining a device according to some embodiments of the present disclosure.

FIG. 3 is a block diagram for explaining a device according to some embodiments of the present disclosure. With respect to FIG. 3, redundant content already described in FIGS. 1 and 2 will not be repeated, and the following description will focus on the differences.

Referring to FIG. 3, the device 100 may include a processor 110, a storage unit 120, and a communication unit 130. The components illustrated in FIG. 3 are not essential for implementing the device 100, and the device 100 described in the present disclosure may have more or fewer components than those listed above.

Each component of the device 100 in the present disclosure may be integrated, added, or omitted depending on the specifications of the actual implementation of the device 100. That is, two or more components may be combined into one component, or one component may be subdivided into two or more components, as needed. In addition, the functions performed in each block are provided for the purpose of describing the embodiments of the present disclosure, and the specific operations or devices do not limit the scope of rights of the present invention.

The communication unit 130 may include one or more modules that enable wired or wireless communication between the device 100 and a wired/wireless communication system, between the device 100 and the client device C, or between the device 100 and the external device 200. In addition, the communication unit 130 may include one or more modules for connecting the device 100 to one or more networks.

The communication unit 130 refers to a module for wired/wireless internet access and may be embedded in or externally connected to the device 100. The communication unit 130 may be configured to transmit and receive wired/wireless signals.

The communication unit 130 may transmit and receive wireless signals with at least one of a base station, the external device 200, or the client device C over a mobile communication network established according to technical standards or communication methods for mobile communication (e.g., GSM (Global System for Mobile communication), CDMA (Code Division Multiple Access), CDMA2000 (Code Division Multiple Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.).

Examples of wireless internet technologies may include WLAN (Wireless LAN), Wi-Fi (Wireless Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), and LTE-A (Long Term Evolution-Advanced). However, the communication unit 130 may transmit and receive data according to at least one wireless internet technology, including those not listed above.

According to some embodiments of the present disclosure, the device 100 may be connected to the external device 200 and/or the client device C via a wired/wireless network through the communication unit 130. Here, the term "wired/wireless network" collectively refers to communication networks that support various communication standards or protocols for transmitting and receiving data between the device 100 and other devices, the device 100 and the external device 200, or the device 100 and the client device C. Such wired/wireless networks include all communication networks currently or in the future supported by standards and are capable of supporting one or more communication protocols for that purpose.

The storage unit 120 may store data for supporting various functions of the device 100. The storage unit 120 may store multiple application programs (or applications) executed on the device 100 and data, instructions, and at least one program instruction for operating the device 100. Meanwhile, the application programs may be stored in the storage unit 120 and installed on the device 100 to be executed by the processor 110 in order to perform operations (or functions) of the device 100.

The storage unit 120 may also store various types of information generated or determined by the processor 110, as well as video data and other types of information received through the communication unit 130.

The storage unit 120 may include at least one type of storage medium such as a flash memory type, hard disk type, SSD (Solid State Disk) type, SDD (Silicon Disk Drive) type, multimedia card micro type, card-type memory (e.g., SD or XD memory), RAM (random access memory), SRAM (static random access memory), ROM (read-only memory), EEPROM (electrically erasable programmable read-only memory), PROM (programmable read-only memory), magnetic memory, magnetic disk, and optical disk. The device 100 may also operate in connection with web storage that performs the storage function of the storage unit 120 over the internet.

According to some embodiments of the present disclosure, the storage unit 120 may store a pre-trained artificial intelligence model configured to output an output value related to an event indicating that the sow has completed farrowing of a newborn piglet when each of a plurality of image frames constituting the video data is input.

The processor 110 may control the overall operation of the device 100 in addition to operations related to application programs. The processor 110 may process signals, data, or information input or output through the components of the device 100, or may execute application programs stored in the storage unit 120 to provide or process appropriate information or functions.

The processor 110 may control at least some of the components of the device 100 to execute application programs stored in the storage unit 120. Furthermore, the processor 110 may operate two or more components among those included in the device 100 in combination to execute the application programs.

The processor 110 may be composed of one or more cores and may be any processor among various commercially available processors. For example, the processor 110 may include a central processing unit (CPU), a general-purpose graphics processing unit (GPGPU), or a tensor processing unit (TPU). However, the present disclosure is not limited thereto.

The processor 110 of the present disclosure may be configured as a dual processor or other multi-processor architecture. However, the present disclosure is not limited thereto.

The processor 110 may read a computer program stored in the storage unit 120 and recognize whether an event indicating that the sow has completed farrowing of a newborn piglet has occurred, using a pre-trained artificial intelligence model according to some embodiments of the present disclosure.

Specifically, the processor of the device 100 may sequentially input each of a plurality of image frames constituting the video data into a pre-trained artificial intelligence model. Then, the processor 110 may recognize whether an event has occurred based on changes in the output values output from the pre-trained artificial intelligence model. Details thereof will be described with reference to FIG. 4.

Figure 4:
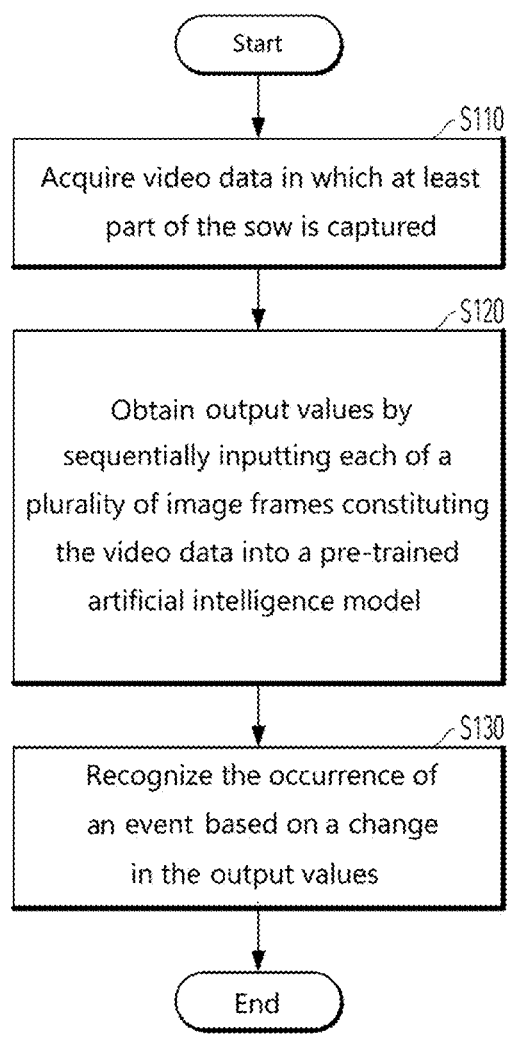
FIG. 4 is a flowchart for explaining an example of a method for recognizing whether an event indicating that a sow has completed farrowing of a newborn piglet has occurred, according to some embodiments of the present disclosure.
Figure 5:
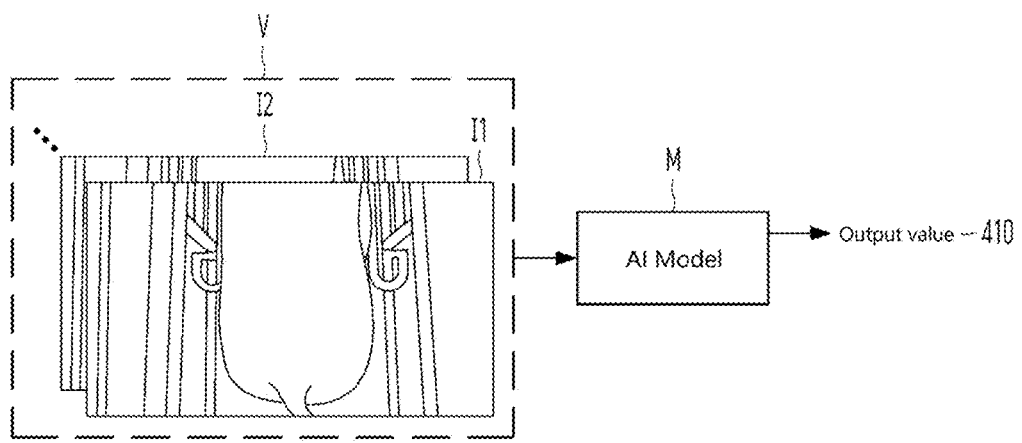
FIG. 5 is a diagram for explaining an example of a method for recognizing whether an event indicating that a sow has completed farrowing of a newborn piglet has occurred, according to some embodiments of the present disclosure.

FIG. 4 is a flowchart for explaining an example of a method for recognizing whether an event indicating that a sow has completed farrowing of a newborn piglet has occurred, according to some embodiments of the present disclosure. FIG. 5 is a diagram for explaining an example of a method for recognizing whether an event indicating that a sow has completed farrowing of a newborn piglet has occurred, according to some embodiments of the present disclosure. FIGS. 6 to 9 are diagrams for explaining examples of output values generated by a pre-trained artificial intelligence model according to some embodiments of the present disclosure. With respect to FIGS. 4 to 9, redundant content already described in connection with FIGS. 1 to 3 will not be repeated, and the following description will focus on the differences.

Referring to FIG. 4, the processor 110 may acquire video data in which at least part of the sow is captured from the external device 200 through the communication unit 130 (S110).

Specifically, the image acquisition unit 210 may be positioned at a specific location so that at least part of the sow can be captured. The image acquisition unit 210 may transmit video data, in which at least part of the sow is captured, to the external device 200. When the external device 200 receives the video data from the image acquisition unit 210, it may transmit the video data to the device 100 periodically or non-periodically. In this case, the processor 110 may receive the video data transmitted from the external device 200 through the communication unit 130. However, the present disclosure is not limited thereto, and the video data may also be transmitted to the device 100 in real time.

According to some embodiments of the present disclosure, a plurality of image acquisition units 210 may be installed in the pig house to capture at least part of each of a plurality of sows. In this case, the video data acquired by each of the plurality of image acquisition units 210 may be transmitted to the external device 200, and the external device 200 may transmit the video data acquired from each of the plurality of image acquisition units 210 to the device 100 periodically or non-periodically. The processor 110 may receive the video data acquired from each of the plurality of image acquisition units 210 from the external device 200 through the communication unit 130. However, the present disclosure is not limited thereto, and the plurality of video data may also be transmitted to the device 100 in real time.

When the processor 110 acquires video data in step S110, it may obtain output values by sequentially inputting each of a plurality of image frames constituting the video data into a pre-trained artificial intelligence model (S120). In the present disclosure, the pre-trained artificial intelligence model may be a model that has been trained in advance to output an output value related to an image frame when the image frame is input. Further details thereof will be described below with reference to FIG. 11.

In the present disclosure, the output value may be an output value related to an event indicating that the sow has completed farrowing of a newborn piglet. However, the present disclosure is not limited thereto.

Specifically, referring to FIG. 5, the processor 110 may sequentially input each of a plurality of image frames (I1, I2, . . . ) constituting video data V into a pre-trained artificial intelligence model M. When the image frames are sequentially input, the artificial intelligence model may output output values 410 corresponding to each image frame. Here, the output value may be a value related to an event indicating that the sow has completed farrowing of a newborn piglet.

For example, when a first image frame I1 among the plurality of image frames constituting the video data is input into the artificial intelligence model M, the artificial intelligence model M may output an output value 410 related to the first image frame I1. Then, when a second image frame I2 among the plurality of image frames constituting the video data is input into the artificial intelligence model M, the artificial intelligence model M may output an output value 410 related to the second image frame I2.

Figure 6:
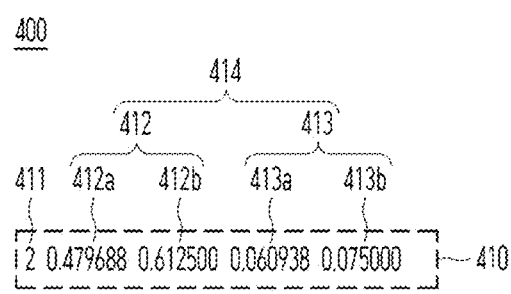
FIGS. 6 to 9 are diagrams for explaining examples of output values generated by a pre-trained artificial intelligence model according to some embodiments of the present disclosure.

Referring to FIG. 6, the output value 410 may represent an output value related to an event indicating that the sow has completed farrowing of a newborn piglet.

The output value 410 may include a farrowing recognition class value 411 related to the recognition of farrowing and information 414 on a region related to the recognition of farrowing.

The farrowing recognition class value 411 may represent a value indicating whether farrowing has occurred and the extent to which farrowing has progressed. That is, the farrowing recognition class value 411 may have different values depending on whether farrowing has occurred and the degree of farrowing. However, the present disclosure is not limited thereto.

The region related to the recognition of farrowing may refer to a region identified during the process of recognizing farrowing.

The information 414 on the region related to the recognition of farrowing may include information 412 related to the position of a center value of the region and information 413 related to the size of the region.

Figure 7:
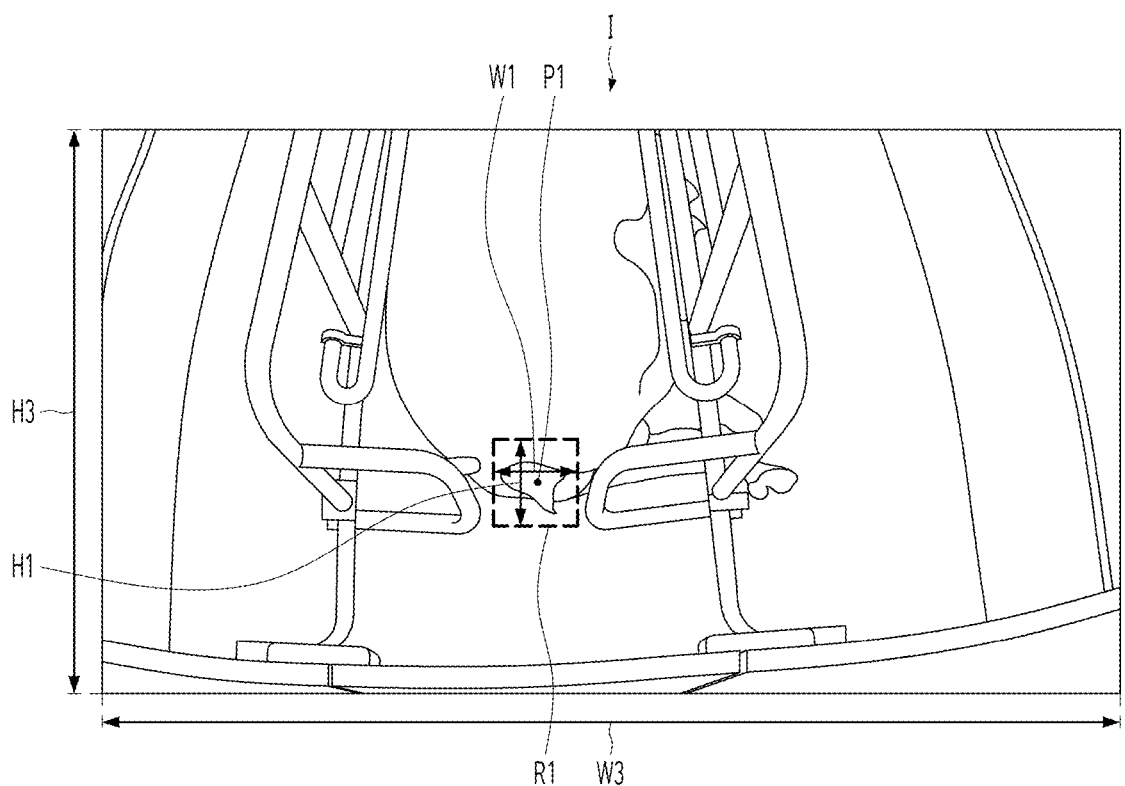

Referring to FIG. 7, the region R1 related to the recognition of farrowing may be a region, within the image frame I corresponding to the output value, having a size in which a specific object may be included based on the area where the uterus of the sow is located. Here, the specific object included in the region R1 related to the recognition of farrowing may include at least one of the uterus of the sow and at least part of a piglet being discharged from the uterus of the sow. However, the present disclosure is not limited thereto.

In the present disclosure, the information 412 related to the position of the center value of the region R1 related to the recognition of farrowing may indicate the position at which a point P1 located at the center of the region is placed in the image frame I. Specifically, the information 412 related to the position of the center value of the region R1 may include a value obtained by dividing the x-coordinate of point P1 within the image frame I by the width W3 of the image frame I corresponding to the output value (412a in FIG. 6), and a value obtained by dividing the y-coordinate of point P1 within the image frame I by the height H3 of the image frame I corresponding to the output value (412b in FIG. 6).

As described above, when the x and y coordinates of point P1 are divided by the width and height of the image frame I corresponding to the output value and expressed as the information 412 related to the position of the center value of the region R1, the values included in the information 412 may be limited to real numbers between 0 and 1. Therefore, when training the artificial intelligence model M, it is possible to prevent the generation of noise data or overfitting. In addition, since the values are converted into real numbers between 0 and 1 during the training process as described above, the output values of the artificial intelligence model M during inference may also have real number values between 0 and 1.

In the present disclosure, the information 413 related to the size of the region R1 related to the recognition of farrowing may include a horizontal length value obtained by dividing the horizontal length W1 of the region R1 by the horizontal length W3 of the image frame I corresponding to the output value, and a vertical length value obtained by dividing the vertical length H1 of the region R1 by the vertical length H3 of the image frame I1 corresponding to the output value.

As described above, when the horizontal length W1 and vertical length H1 of the region R1 related to the recognition of farrowing are divided by the horizontal length W3 and vertical length H3 of the image frame I corresponding to the output value, the horizontal and vertical length values included in the information 413 related to the size of the region R1 may be limited to real number values between 0 and 1. Therefore, during training of the artificial intelligence model M, it is possible to prevent the generation of noise data or overfitting. Furthermore, since the values are converted into real number values between 0 and 1 during training as described above, the output values of the artificial intelligence model M during inference may also be real numbers between 0 and 1.

Figure 8:
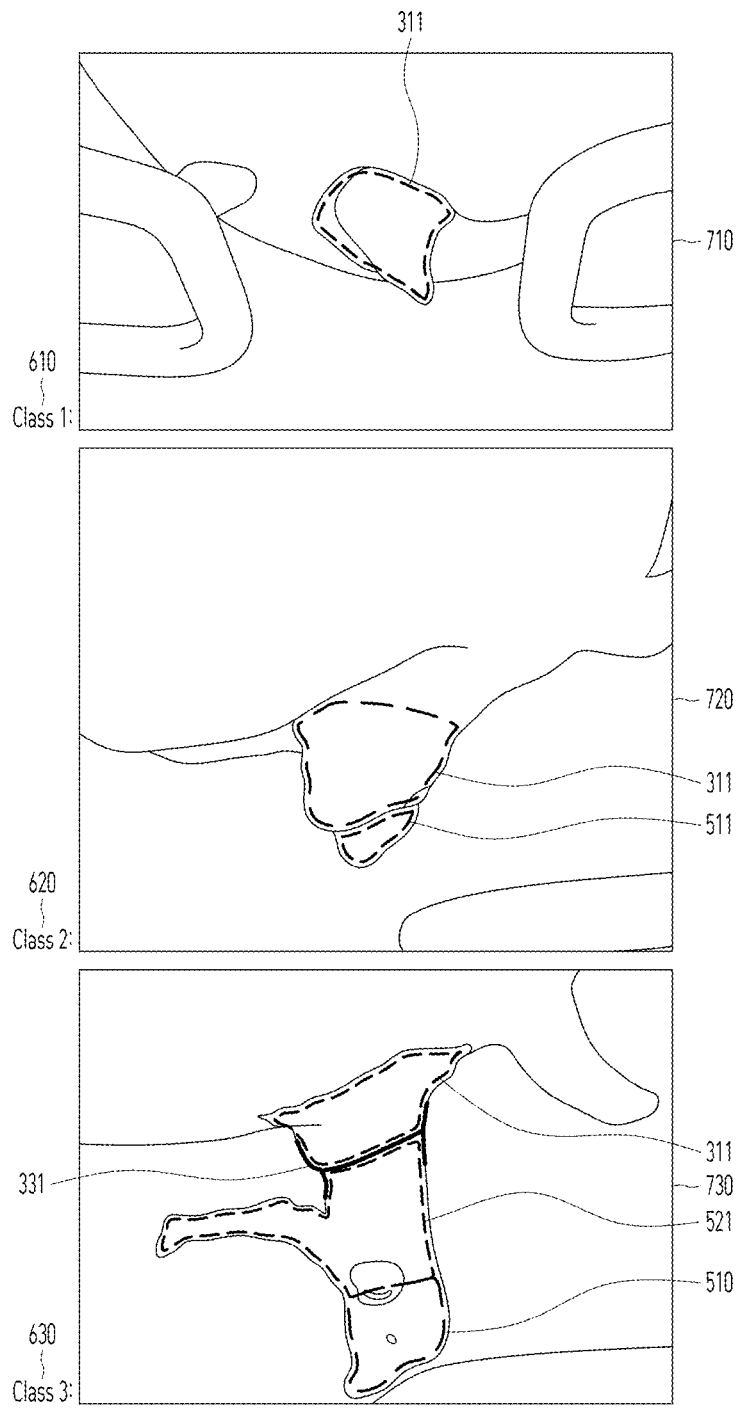

Meanwhile, the farrowing recognition class value will be described with reference to FIG. 8. FIG. 8 is an enlarged view showing a region related to the recognition of farrowing within an image frame, provided for ease of explanation. In addition, although the farrowing recognition class values shown in FIG. 8 are labeled as Class 1, Class 2, and Class 3 for the sake of explanation, the farrowing recognition class values may actually be positive integer values such as 1, 2, and 3. However, the present disclosure is not limited thereto.

Referring to FIG. 8, the farrowing recognition class value may include a first farrowing recognition class value 610 indicating the uterus 311 of the sow, a second farrowing recognition class value 620, and a third farrowing recognition class value 630, which are classified based on the extent to which the piglet has been discharged from the uterus 311 after the sow has started farrowing. However, the present disclosure is not limited thereto.

Specifically, when an image frame 710 including the uterus 311 of the sow but excluding a preset object (for example, a piglet in the process of farrowing) is input into the artificial intelligence model M, the farrowing recognition class value 411 included in the output value 410 may be the first farrowing recognition class value 610. That is, the first farrowing recognition class value 610 may represent a class value indicating the state before the start of farrowing. Since the preset object is not included in the image frame before the sow begins to farrow the piglet 500, and the uterus 311 of the sow may be included in the image frame, the first farrowing recognition class value may be expressed as a class value indicating the uterus.

According to some embodiments of the present disclosure, the second farrowing recognition class value 620 and the third farrowing recognition class value 630 may be distinguished based on which part of the piglet has been discharged from the uterus 311.

Figure 9:
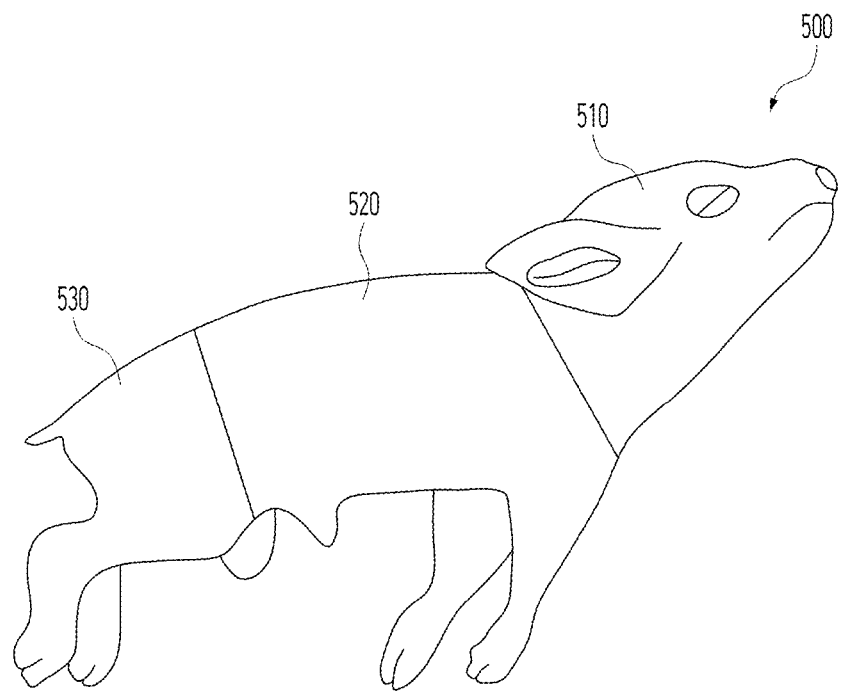

Referring to FIG. 9, the region from the neck of the piglet 500 to the pelvis may be classified as a second portion 520, the region from the neck to one end where the snout of the piglet is located may be classified as a first portion 510, and the region from the pelvis to the other end where the tail of the piglet is located may be classified as a third portion 530. However, the present disclosure is not limited thereto.

Referring again to FIG. 8, when an image frame 720 including at least portion 511 of the first portion of the piglet 500 and the uterus 311 is input into the artificial intelligence model M, the farrowing recognition class value 411 included in the output value 410 may be the second farrowing recognition class value 620. The second farrowing recognition class value 620 may indicate a state in which, after the sow has started farrowing the piglet 500, the preset portion of the piglet, i.e., the second portion 520, has not yet been discharged from the uterus 311, and may represent that less than one-third of the piglet has been discharged.

Meanwhile, although not shown in the drawings, when an image frame including at least portion of the third portion 530 of the piglet 500 and the uterus 311 is input into the artificial intelligence model M, the farrowing recognition class value 411 included in the output value 410 may also be the second farrowing recognition class value 620, as described above. That is, the second farrowing recognition class value 620 indicates that less than one-third of the piglet has been discharged, rather than indicating which specific portion has been discharged.

Although not shown in the drawings, when an image frame is input into the artificial intelligence model including the uterus 311, the entire first portion 510 (or third portion 530) of the piglet, and at least part of the third portion 530

(or first portion 510), along with the entire second portion 520, which is a preset portion of the piglet, the farrowing recognition class value 411 included in the output value 410 may also be the second farrowing recognition class value 620. That is, the second farrowing recognition class value 620 may also indicate that more than two-thirds of the piglet has been discharged.

When an image frame 730 including the entire first portion 510 of the piglet, at least part 521 of the second portion, which is a preset portion of the piglet, and the uterus 311 is input into the artificial intelligence model M, the farrowing recognition class value 411 included in the output value 410 may be the third farrowing recognition class value 630. The third farrowing recognition class value 630 may indicate a state in which at least part 521 of the second portion of the piglet has begun to be discharged from the uterus 311, and only one of the first portion 510 or the third portion 530 has been discharged together with at least part 521 of the second portion. That is, the third farrowing recognition class value 630 may represent that one-third or more but not more than two-thirds of the piglet has been discharged.

As a result, the third farrowing recognition class value 630 may be defined as a state in which at least part 521 of the preset portion (second portion 520) of the piglet 500 has been discharged from the uterus, and the second farrowing recognition class value 620 may be defined as a state after the sow has started farrowing the piglet 500, in which the preset portion (second portion 520) of the piglet has not yet been discharged from the uterus or the entire preset portion has already been discharged from the uterus.

Meanwhile, according to some embodiments of the present disclosure, the third farrowing recognition class value 630 may be subdivided into a plurality of class values. That is, the farrowing recognition class value 411 included in the output value may be one of the plurality of class values resulting from subdividing the third farrowing recognition class value 630. In other words, when an image frame in which one-third or more but not more than two-thirds of the piglet has been discharged is input into the artificial intelligence model, the farrowing recognition class value included in the output value from the model may be one of the subdivided class values of the third farrowing recognition class value 630.

The plurality of class values may be classified into: a first class value indicating a state in which at least part of the preset portion of the piglet has been discharged from the uterus and the uterus or the piglet is occluded by a preset obstacle; a second class value indicating a state in which a preset object overlaps with at least part of the piglet; and a third class value indicating a case in which a preset shape is formed by at least part of the edge of the piglet and at least part of the edge of the uterus.

For example, when an image frame related to a state in which at least part 521 of the second portion 520, which is a preset portion of the piglet, has been discharged from the uterus 311, and the uterus or the piglet is occluded by a preset obstacle is input into the artificial intelligence model M, the farrowing recognition class value 411 included in the output value 410 may be a first class value. Here, the preset obstacle may be defined as a fixing frame (S in FIG. 2) for preventing the piglet from being crushed. However, the present disclosure is not limited thereto.

In another example, when an image frame related to a state in which at least part 521 of the second portion 520, which is a preset portion of the piglet, has been discharged from the uterus 311 and a preset object overlaps with at least part of the piglet is input into the artificial intelligence model M, the farrowing recognition class value 411 included in the output value 410 may be a second class value. Here, the preset object may include at least one of a tail of the sow, another piglet that was farrowed before the currently farrowing piglet, and a placenta. However, the present disclosure is not limited thereto.

In another example, when an image frame in which at least part 521 of the second portion 520, which is a preset portion of the piglet, has been discharged from the uterus 311 and includes a preset shape 331 formed by at least part of the edge of the piglet and at least part of the edge of the uterus is input into the artificial intelligence model M, the farrowing recognition class value 411 included in the output value 410 may be a third class value. Here, the preset shape 331 may be an H-shape. However, the farrowing recognition class value included in the output value from the artificial intelligence model does not necessarily have the third class value only when the H-shape is exactly present in the image frame; rather, if the image frame input into the artificial intelligence model M is such that the model recognizes it as having an H-shape, the farrowing recognition class value in the output value may be the third class value. Meanwhile, when the above-described image frame is input, the artificial intelligence model M may recognize whether the preset shape 331 is formed by at least part of the edge of the piglet and at least part of the edge of the uterus included in the image frame.

Referring again to FIG. 4, when the processor 110 obtains the output value in step S120, it may recognize the occurrence of an event based on a change in the output values (S130). Here, the event may indicate that the sow has completed farrowing of a newborn piglet.

According to some embodiments of the present disclosure, the processor 110 may recognize that an event has occurred when the farrowing recognition class value 411 included in the output value 410 changes sequentially in a preset order. Here, the preset order may mean that the farrowing recognition class value 411 changes in the sequence of: from the first farrowing recognition class value 610 to the second farrowing recognition class value 620, from the second farrowing recognition class value 620 to the third farrowing recognition class value 630, from the third farrowing recognition class value 630 back to the second farrowing recognition class value 620, and from the second farrowing recognition class value 620 to the first farrowing recognition class value 610.

Specifically, the processor 110 may recognize that an event has occurred when the farrowing recognition class value 411 included in the output value 410 changes from the first farrowing recognition class value 610 to the second farrowing recognition class value 620, and then sequentially to the third farrowing recognition class value 630, the second farrowing recognition class value 620, and back to the first farrowing recognition class value 610. Here, the third farrowing recognition class value may be any one of the first class value, the second class value, or the third class value. However, the present disclosure is not limited thereto.

The first farrowing recognition class value 610 is a class value indicating either the state before the start of farrowing or the completion of farrowing. The second farrowing recognition class value 620 is a class value indicating that less than one-third of the piglet has been discharged or that more than two-thirds of the piglet has been discharged. The third farrowing recognition class value 630 is a class value indicating that one-third or more but not more than two-thirds of the piglet has been discharged. Accordingly, when the farrowing recognition class value changes from the first farrowing recognition class value 610 to the second farrowing recognition class value 620, it may indicate that farrowing has started. When the value changes from the second farrowing recognition class value 620 to the third farrowing recognition class value 630, it may indicate that farrowing is in progress. When the value changes from the third farrowing recognition class value 630 back to the second farrowing recognition class value 620, it may indicate that farrowing continues to progress. Finally, when the value changes from the second farrowing recognition class value 620 to the first farrowing recognition class value 610, it may indicate that farrowing has been completed.

As a result, the processor 110 may recognize that the sow has completed farrowing of a newborn piglet when the farrowing recognition class value 411 included in the output value 410 has changed in the preset order. Here, the newborn piglet may refer to the piglet that was most recently scheduled for farrowing or in the process of farrowing.

However, in the present disclosure, the occurrence of an event does not immediately mean that the sow is recognized as having completed farrowing of a newborn piglet. Rather, the video may be reanalyzed to finally determine whether the sow has completed farrowing. Specifically, the processor 110 may determine to perform reanalysis of the video data when the farrowing recognition class value included in the output value has changed from the first farrowing recognition class value to the second farrowing recognition class value, and then sequentially to the third farrowing recognition class value, back to the second, and finally to the first farrowing recognition class value. In other words, recognizing whether an event has occurred may serve as a trigger for determining whether to proceed with reanalysis of the video.

According to some embodiments of the present disclosure, the processor 110 may cause a region related to the recognition of farrowing to be displayed on each of the plurality of frames constituting the video data, based on the information 414 on the region related to the recognition of farrowing included in the output value 410. In this case, when the video data is displayed on the web page accessed through the client device C, the video data may be displayed together with the region related to the recognition of farrowing. However, the present disclosure is not limited thereto.

According to conventional technology, in order to recognize whether a sow has farrowed, the processor 110 would input the video data into an artificial intelligence model and directly use the output value generated by the model for determination. In other words, the output value included information about whether the sow had farrowed. Therefore, in the conventional approach, errors occurred in which the system incorrectly recognized whether the sow had farrowed.

However, according to some embodiments of the present disclosure, the processor 110 may sequentially input each of a plurality of image frames constituting the video data into the artificial intelligence model and recognize whether the sow has farrowed based on changes in the plurality of output values generated by the artificial intelligence model. It has been experimentally confirmed that, when recognizing whether the sow has farrowed according to some embodiments of the present disclosure, errors in recognition do not occur. Therefore, according to some embodiments of the present disclosure, the reliability of the product itself can be significantly improved.

Figure 10:
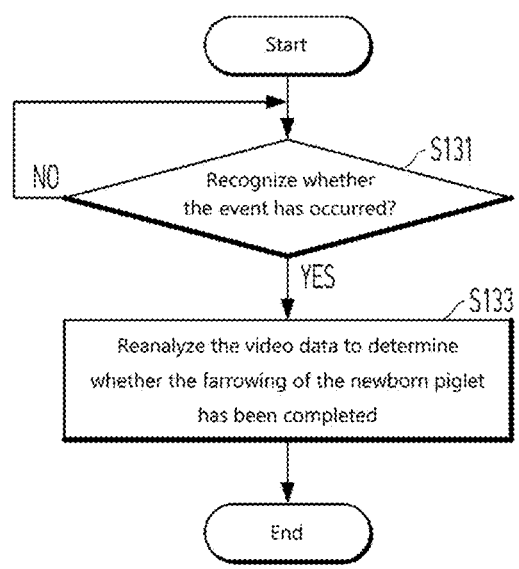
FIG. 10 is a flowchart for explaining an example of a method for determining whether a sow has completed farrowing of a newborn piglet according to some embodiments of the present disclosure.

FIG. 10 is a flowchart for explaining an example of a method for determining whether a sow has completed farrowing of a newborn piglet according to some embodiments of the present disclosure. With respect to FIG. 10, redundant content already described in FIGS. 1 to 9 will not be repeated, and the following description will focus on the differences.

Referring to FIG. 10, the processor 110 may recognize whether an event has occurred (S131). Specifically, the processor 110 may sequentially input each of a plurality of image frames constituting the video data acquired from the external device into the artificial intelligence model. Then, the processor 110 may recognize a change in the farrowing recognition class value included in the output value related to the event indicating that the sow has completed farrowing of a newborn piglet, which is output by the artificial intelligence model. If the processor 110 recognizes that the farrowing recognition class value has changed according to a preset order, it may determine that the event has occurred.

If the processor 110 determines that the event has not occurred, that is, if it recognizes that no event has occurred (S131, No), it may continue to recognize in real time whether the event has occurred. However, the present disclosure is not limited thereto.

If the processor 110 recognizes that an event has occurred (S131, Yes), that is, if it determines to perform reanalysis of the video data, it may reanalyze the video data in order to finally determine whether the sow has completed farrowing of the newborn piglet (S133). Here, the method of reanalyzing the video data may be performed using various techniques.

For example, the processor 110 may sequentially input each of a plurality of image frames constituting the video data into an artificial intelligence model different from the artificial intelligence model M shown in FIG. 5, in order to recognize whether the sow has completed farrowing of the newborn piglet.

In another example, the processor 110 may analyze the video data based on rules to recognize whether the sow has completed farrowing of the newborn piglet.

However, the above examples are merely illustrative, and the present disclosure is not limited to the examples described above.

As a result, when the processor 110 determines to perform reanalysis of the video data, it may determine whether the sow has completed farrowing of the newborn piglet based on the result of the reanalysis.

According to some embodiments of the present disclosure, when the processor 110 reanalyzes the video data and recognizes that the sow has completed farrowing of the newborn piglet, it may also recognize information on the date and time when the sow started farrowing the newborn piglet and the date and time when the farrowing was completed. However, the present disclosure is not limited thereto.

When the change in the output value generated by the artificial intelligence model is not directly used to recognize whether the sow has completed farrowing of the newborn piglet, but instead is used as a trigger to determine whether to reanalyze the video, and the recognition is performed based on the result of the reanalysis, the accuracy of the result value for determining whether the newborn piglet has been completely farrowed can be significantly improved. Therefore, customer trust in the product itself can be enhanced.

In the present disclosure, reanalysis of the video data may refer to analyzing the video data in a more sophisticated manner than recognizing an event based on FIG. 4. Therefore, as described in FIG. 4, recognizing an event may require less time, while reanalysis may take longer. According to some embodiments of the present disclosure, when recognizing whether the sow has completed farrowing of a newborn piglet, the occurrence of an event may first be recognized based on changes in output values—a relatively fast determination method—and then a decision may be made as to whether video reanalysis should be performed. In this case, the reanalysis of the video is performed only when it is determined to be necessary. As a result, whether the sow has completed farrowing of the newborn piglet can be recognized quickly and accurately.

Figure 11:
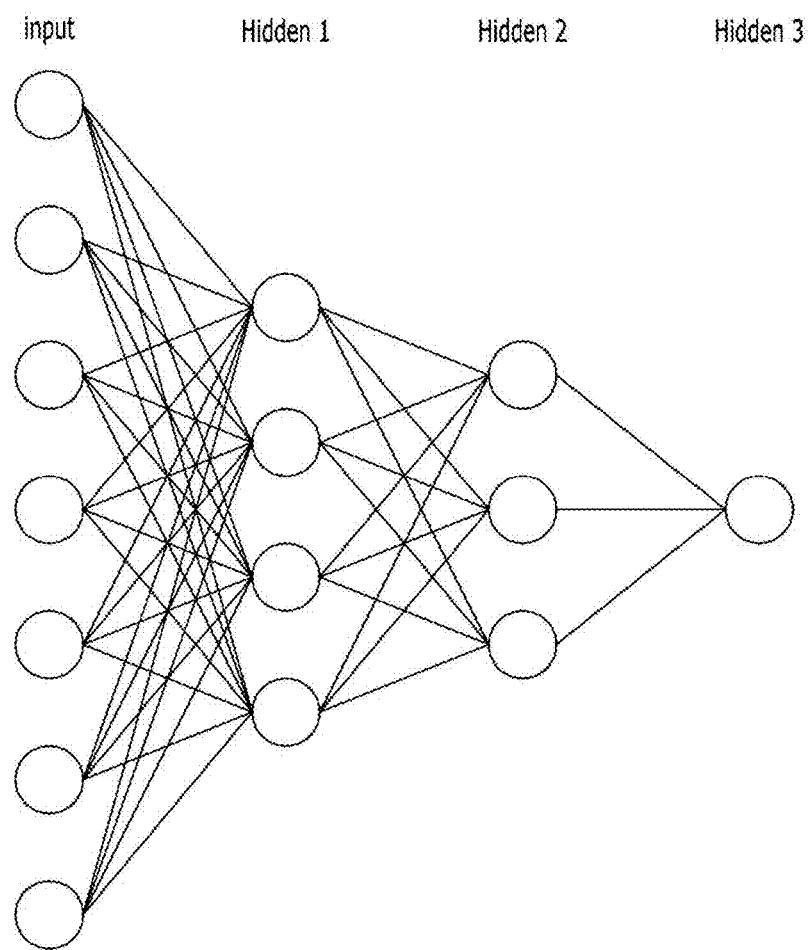
FIG. 11 is a schematic diagram showing an artificial intelligence model according to an embodiment of the present disclosure.

FIG. 11 is a schematic diagram showing an artificial intelligence model according to an embodiment of the present disclosure. With respect to FIG. 11, redundant content already described in FIGS. 1 to 10 will not be repeated, and the following description will focus on the differences.

Throughout this specification, the terms artificial intelligence model, neural network, network function, and neural network may be used interchangeably. An artificial intelligence model may generally be composed of a set of interconnected computational units referred to as "nodes." These nodes may also be referred to as "neurons." The artificial intelligence model is configured to include at least one or more nodes. The nodes (or neurons) constituting the artificial intelligence model may be interconnected via one or more "links."

Within the artificial intelligence model, one or more nodes connected through links may form a relationship of input nodes and output nodes in a relative sense. The concepts of input node and output node are relative, such that a node serving as an output node with respect to a given node may serve as an input node with respect to another node, and vice versa. As described above, the input-output node relationship may be established based on the links. One input node may be connected to one or more output nodes through links, and the reverse may also be true.

In the relationship between an input node and an output node connected by a single link, the value of the output node may be determined based on the data input to the input node. Here, the node that interconnects the input node and the output node may have a weight. The weight may be variable and may be adjusted by a user or an algorithm in order for the artificial intelligence model to perform a desired function. For example, when one output node is connected to one or more input nodes through respective links, the output node may determine its value based on the values input to the connected input nodes and the weights assigned to the respective links corresponding to those input nodes.

As described above, in the artificial intelligence model, one or more nodes are interconnected through one or more links to form input-output node relationships within the model. The characteristics of the artificial intelligence model may be determined based on the number of nodes and links, the relationships among the nodes and links, and the values of the weights assigned to the respective links. For example, even if two artificial intelligence models have the same number of nodes and links, if the weight values assigned to the links differ, the two models may be recognized as being different from each other.

The artificial intelligence model may be configured to include one or more nodes. Among the nodes that make up the artificial intelligence model, a subset of nodes may form a layer based on their distances from the initial input node. For example, a group of nodes located at a distance of n from the initial input node may constitute the n-th layer. The distance from the initial input node may be defined as the minimum number of links that must be traversed to reach the corresponding node. However, such a definition of layers is arbitrary and provided for explanation purposes, and the layer order within the artificial intelligence model may be defined in other ways. For instance, the layers of nodes may also be defined based on their distance from the final output node.

An initial input node may refer to one or more nodes in the artificial intelligence model into which data is directly input without passing through any links in relation to other nodes. Alternatively, in terms of the relationships between nodes based on links within the artificial intelligence model, it may refer to a node that has no other input nodes connected via links. Similarly, a final output node may refer to one or more nodes in the artificial intelligence model that do not have any output nodes in relation to other nodes. In addition, a hidden node may refer to a node in the artificial intelligence model that is neither an initial input node nor a final output node. In one embodiment of the present disclosure, the artificial intelligence model may have the same number of nodes in the input layer and the output layer, and may be structured such that the number of nodes decreases and then increases again as the model progresses from the input layer to the hidden layers. In another embodiment of the present disclosure, the artificial intelligence model may have fewer nodes in the input layer than in the output layer, and the number of nodes may decrease as the model progresses from the input layer to the hidden layers. In yet another embodiment, the artificial intelligence model may have more nodes in the input layer than in the output layer, and the number of nodes may increase from the input layer to the hidden layers. In still another embodiment, the artificial intelligence model may be a neural network that combines the above-described structures.

A deep neural network (DNN) may refer to an artificial intelligence model that includes multiple hidden layers in addition to an input layer and an output layer. By using a deep neural network, it is possible to identify latent structures in data. That is, it can uncover latent structures in images, text, video, speech, and music (for example, identifying objects in an image, understanding the content and sentiment of text, or detecting the content and emotion in speech). Examples of deep neural networks include convolutional neural networks (CNN), recurrent neural networks (RNN), autoencoders, generative adversarial networks (GAN), restricted Boltzmann machines (RBM), deep belief networks (DBN), Q-networks, U-networks, and Siamese networks. The above description of deep neural networks is provided by way of example only, and the present disclosure is not limited thereto.

The artificial intelligence model may be trained using a supervised learning approach. The goal of training a neural network is to minimize the output error. In the training process of the artificial intelligence model, training data is repeatedly input into the neural network, and the error between the network's output and the target for the training data is calculated. The error is then backpropagated from the output layer toward the input layer in order to update the weights of the nodes in the neural network in a direction that reduces the error. In the case of supervised learning, training data with labeled answers (i.e., labeled training data) can be used.

Specifically, the processor 110 may obtain a training dataset composed of a plurality of image data in which at least part of the sow is captured, along with label data labeled for each of the plurality of image data. Here, various types of images may be used as the plurality of image data constituting the training dataset, such as image data of a sow before the start of farrowing, image data of a sow that has just started farrowing, and image data of a sow that has discharged approximately two-thirds of the piglet.

The label data labeled for each of the plurality of image data may include a farrowing recognition class value related to the recognition of farrowing and information on a region related to the recognition of farrowing. Detailed descriptions of the farrowing recognition class value and the information on the region, which constitute the label data, have been provided above with reference to FIGS. 6 to 9, and thus detailed explanation thereof will be omitted.

In the present disclosure, the training dataset may refer to a set of data in which label data is labeled for each of various types of image data.

Meanwhile, when the processor 110 obtains the training dataset, it may train the artificial intelligence model using the training dataset. During training, the image data labeled with label data from the training dataset may be input into the artificial intelligence model, and the error may be calculated by comparing the output value generated by the model with the label data assigned to the image data. The calculated error is then backpropagated through the artificial intelligence model in the reverse direction (i.e., from the output layer toward the input layer), and the connection weights of the nodes in each layer of the model may be updated based on the backpropagation. As a result, the artificial intelligence model can be adjusted so that when image data is input, it produces output values similar to the label data. In this way, the processor 110 may train the artificial intelligence model by inputting each of the plurality of image data included in the training dataset into the model, calculating the error between the label data and the output value for each image, and performing backpropagation.

Meanwhile, the amount of change in the connection weight of each node being updated may be determined by a learning rate. The computation of the artificial intelligence model for input data and the backpropagation of the error may constitute a training cycle (epoch). The learning rate may be applied differently depending on the number of training cycles. For example, in the early stages of training, a high learning rate may be used so that the artificial intelligence model can quickly reach a certain level of performance, thereby improving efficiency, and in the later stages, a lower learning rate may be used to increase accuracy. In general, the training data used in model training may be a subset of the actual data (i.e., the data to be processed using the trained artificial intelligence model). Therefore, there may be training cycles in which the error for the training data decreases, but the error for the actual data increases. Overfitting is a phenomenon in which the model learns the training data too well, resulting in increased error for actual data. Overfitting can serve as a cause of errors in machine learning algorithms. To prevent overfitting, various optimization techniques may be applied. For example, overfitting may be prevented by increasing the amount of training data, applying regularization, or using techniques such as dropout, which omits some of the nodes in the network during the training process.

As described above, the trained artificial intelligence model may perform the following operations. For ease of explanation, it is assumed that image frames representing different states related to farrowing are input into the artificial intelligence model, and the following description is based on that assumption.

When a first image frame, among the plurality of image frames constituting the video data, in which at least part of the edges of a plurality of objects forms a preset shape is input into the artificial intelligence model, the artificial intelligence model may output an output value including a first specific class value (i.e., the third class value among the third farrowing recognition class values 630 described in FIG. 8) indicating that farrowing is in progress, and information on a region in which the first specific class value is recognized. Here, the plurality of objects may include a piglet, of which at least part of a preset portion has been discharged from the uterus of the sow, and the uterus of the sow. The preset shape may be an H-shape. The first specific class value may be defined as a state in which at least part of the preset portion (i.e., the second portion 520 in FIG. 9) of the piglet has been discharged from the uterus of the sow but the preset portion of the piglet has not yet been completely discharged from the uterus.

When a second image frame, among the plurality of image frames constituting the video data, which includes an image captured before farrowing and includes the uterus of the sow, is input into the artificial intelligence model, the artificial intelligence model may output an output value including a first farrowing recognition class value (610 in FIG. 8) indicating i that the uterus of the sow is included in the second image frame and information on a region in which the first farrowing recognition class value is recognized.

When a third image frame, among the plurality of image frames constituting the video data, which is related to a time point after the sow has started farrowing the piglet but before the preset portion (second portion 520 in FIG. 9) of the piglet has been discharged from the uterus, or after the preset portion has been completely discharged from the uterus, is input into the artificial intelligence model, the artificial intelligence model may output an output value including a second farrowing recognition class value (620 in FIG. 8) and information on a region in which the second farrowing recognition class value is recognized.

When a fourth image frame, among the plurality of image frames constituting the video data, in which at least part of the preset portion (second portion 520 in FIG. 9) of the piglet has been discharged from the uterus of the sow but the preset portion of the piglet has not yet been completely discharged from the uterus, and at least one of the uterus or the piglet is occluded by a preset obstacle, is input into the artificial intelligence model, the artificial intelligence model may output an output value including a second specific class value (i.e., the first class value among the third farrowing recognition class values 630 described in FIG. 8) and information on a region in which the second specific class value is recognized. Here, the preset obstacle may be defined as a fixing frame for preventing the piglet from being crushed.

When a fifth image frame, among the plurality of image frames constituting the video data, in which at least part of the preset portion (second portion 520 in FIG. 9) of the piglet has been discharged from the uterus of the sow but the preset portion of the piglet has not yet been completely discharged from the uterus and a preset object overlaps with the piglet, is input into the artificial intelligence model, the artificial intelligence model may output an output value including a third specific class value (i.e., the second class value among the third farrowing recognition class values 630 described in FIG. 8) and information on a region in which the third specific class value is recognized. Here, the preset object may include at least one of a tail of the sow, another piglet that was farrowed before the current piglet, and a placenta.

As described above, when recognizing whether the sow has farrowed a newborn piglet based on changes in the class values included in the output value generated by the artificial intelligence model, the accuracy of recognition can be improved.

In the present disclosure, the device 100 is not limited to the configurations and methods of the above-described embodiments being applied in a fixed manner, but rather, all or part of the respective embodiments may be selectively combined and configured to allow for various modifications.

The various embodiments described in the present disclosure may be implemented, for example, using software, hardware, or a combination thereof, on a computer-readable recording medium readable by a computer or a similar device.

In a hardware implementation, some embodiments described herein may be implemented using at least one of application-specific integrated circuits (ASICs), digital signal processors (DSPs), digital signal processing devices (DSPDs), programmable logic devices (PLDs), field programmable gate arrays (FPGAS), processors, controllers, microcontrollers, microprocessors, or other electrical units configured to perform specific functions. In some cases, certain embodiments described in the present disclosure may be implemented by a processor.

In a software implementation, some embodiments such as the procedures and functions described in the present disclosure may be implemented as separate software modules. Each software module may perform one or more functions, tasks, and operations described in the present disclosure. The software code may be implemented as a software application written in an appropriate programming language. Here, the software code may be stored in the storage unit 120 and executed by the processor 110. That is, at least one program instruction may be stored in the storage unit 120, and at least one program instruction may be executed by the processor 110.

The method for recognizing whether a sow has completed farrowing of a newborn piglet by a processor of a device according to some embodiments of the present disclosure may be implemented as code readable by at least one processor on a computer-readable recording medium provided in the device. The computer-readable recording medium refers to any type of recording device in which data readable by at least one processor is stored. Examples of such recording media include Read Only Memory (ROM), Random Access Memory (RAM), CD-ROM, magnetic tape, floppy disks, and optical data storage devices.

Meanwhile, although the present disclosure has been described with reference to the accompanying drawings, this is merely by way of example and is not limited to any specific embodiment. Various modifications may be made by those skilled in the art to which the present invention pertains, and such modifications also fall within the scope of rights defined by the claims. Furthermore, such modifications should not be understood as being separate from the technical spirit of the present invention.

What is claimed is:

1. A method for recognizing whether a sow has completed farrowing of a newborn piglet by a processor of a device, the method comprising:
    acquiring video data in which at least part of the sow is captured from an external device through a communication unit; and
    recognizing whether the sow has completed farrowing of the newborn piglet based on a change in output values related to each of a plurality of image frames constituting the video data, the output values being values output from a pre-trained artificial intelligence model by sequentially inputting each of the plurality of image frames constituting the video data into the pre-trained artificial intelligence model,
    wherein the pre-trained artificial intelligence model, when a first image frame, among the plurality of image frames constituting the video data, in which at least part of edges of a plurality of objects forms a preset shape is input, outputs an output value including a first specific class value indicating that farrowing is in progress and information on a region where the first specific class value is recognized,
    wherein the plurality of objects comprises a piglet of which at least part of a preset portion has been discharged from a uterus of the sow, and the uterus of the sow,
    wherein the preset shape is an H-shape,
    wherein the information includes information related to a position of a center value of the region and information related to a size of the region, and
    wherein the information related to the position of the center value of the region indicates a position at which a point located at a center of the region is placed in the first image frame.

2. The method of claim 1, wherein the information related to the size of the region includes:
    a horizontal length value obtained by dividing a horizontal length of the region by a horizontal length of the first image frame; and
    a vertical length value obtained by dividing a vertical length of the region by a vertical length of the first image frame.

3. The method of claim 1, wherein when a second image frame, captured before farrowing and including the uterus of the sow, among the plurality of image frames constituting the video data, is input into the pre-trained artificial intelligence model, the pre-trained artificial intelligence model outputs an output value including a first farrowing recognition class value indicating that the uterus of the sow is included in the second image frame and information on a region in which the first farrowing recognition class value is recognized.

4. The method of claim 1, wherein the first specific class value is defined as a state in which the at least part of the preset portion of the piglet has been discharged from the uterus of the sow but the preset portion of the piglet has not yet been completely discharged from the uterus.

5. The method of claim 1, wherein when a third image frame, among the plurality of image frames constituting the video data, is input into the pre-trained artificial intelligence model, the pre-trained artificial intelligence model outputs an output value including a second farrowing recognition class value and information on a region in which the second farrowing recognition class value is recognized, and
    wherein the third image frame includes an image related to a time point before the preset portion of the piglet is discharged from the uterus of the sow, after the sow has started the farrowing of the piglet, or related to a time point after the preset portion of the piglet has been completely discharged from the uterus, after the sow has started the farrowing of the piglet.

6. The method of claim 1, wherein when a fourth image frame, among the plurality of image frames constituting the video data, is input into the pre-trained artificial intelligence model, the pre-trained artificial intelligence model outputs an output value including a second specific class value and information on a region in which the second specific class value is recognized, wherein the fourth image frame includes an image in which the at least part of the preset portion of the piglet has been discharged from the uterus of the sow but the preset portion of the piglet has not yet been completely discharged from the uterus, and at least one of the uterus or the piglet is covered by a preset obstacle.

7. The method of claim 1, wherein when a fifth image frame, among the plurality of image frames constituting the video data, is input into the pre-trained artificial intelligence model, the pre-trained artificial intelligence model outputs an output value including a third specific class value and information on a region in which the third specific class value is recognized, wherein the fifth image frame includes an image in a state in which the at least part of the preset portion of the piglet has been discharged from the uterus of the sow but the preset portion of the piglet has not yet been completely discharged from the uterus and a preset object overlaps the piglet.

8. The method of claim 6, wherein the preset obstacle is defined as a fixing frame for preventing the piglet from being crushed.

9. The method of claim 7, wherein the preset object includes at least one of a tail of the sow, another piglet that was farrowed before the piglet, and a placenta.

10. A computer program stored in a non-transitory computer-readable storage medium, wherein the computer program, when executed by a processor of a device, performs steps for recognizing whether a sow has completed farrowing of a piglet, the steps comprising:

acquiring video data in which at least part of the sow is captured from an external device through a communication unit; and recognizing whether the sow has completed farrowing of the newborn piglet based on a change in output values related to each of a plurality of image frames constituting the video data, the output values being values output from a pre-trained artificial intelligence model by sequentially inputting each of the plurality of image frames constituting the video data into the pre-trained artificial intelligence model, wherein the pre-trained artificial intelligence model, when a first image frame, among the plurality of image frames constituting the video data, in which at least part of edges of a plurality of objects forms a preset shape is input, outputs an output value including a first specific class value indicating that farrowing is in progress and information on a region where the first specific class value is recognized, wherein the plurality of objects comprises a piglet of which at least part of a preset portion has been discharged from a uterus of the sow, and the uterus of the sow, wherein the preset shape is an H-shape, wherein the information includes information related to a position of a center value of the region and information related to a size of the region, and wherein the information related to the position of the center value of the region indicates a position at which a point located at a center of the region is placed in the first image frame.

11. A device for recognizing whether a sow has completed farrowing of a piglet, the device comprising:

a communication unit configured to acquire video data, in which at least part of the sow is captured, from an external device;

a storage unit storing a pre-trained artificial intelligence model and at least one program instruction; and a processor configured to execute the at least one program instruction, wherein the processor is configured to recognize whether the sow has completed farrowing of the newborn piglet based on a change in output values related to each of a plurality of image frames constituting the video data, the output values being values output from the pre-trained artificial intelligence model by sequentially inputting each of the plurality of image frames constituting the video data into the pre-trained artificial intelligence model, wherein the pre-trained artificial intelligence model, when a first image frame, among the plurality of image frames constituting the video data, in which at least part of edges of a plurality of objects forms a preset shape is input, outputs an output value including a first specific class value indicating that farrowing is in progress and information on a region where the first specific class value is recognized, wherein the plurality of objects comprises a piglet of which at least part of a preset portion has been discharged from a uterus of the sow, and the uterus of the sow, wherein the preset shape is an H-shape, wherein the information includes information related to a position of a center value of the region and information related to a size of the region, and wherein the information related to the position of the center value of the region indicates a position at which a point located at a center of the region is placed in the first image frame.

12. The method of claim 1, wherein the pre-trained artificial intelligence model comprises a convolutional neural network trained to detect farrowing stages using a dataset of labeled images.

13. The computer program stored in the non-transitory computer-readable storage medium of claim 10, wherein the pre-trained artificial intelligence model comprises a convolutional neural network trained to detect farrowing stages using a dataset of labeled images.

14. The device for recognizing whether a sow has completed farrowing of a piglet of claim 11, wherein the pre-trained artificial intelligence model comprises a convolutional neural network trained to detect farrowing stages using a dataset of labeled images.

* * * * *